May 14, 1940.  J. A. RAMOS  2,200,680
REMOTE CONTROL APPARATUS
Filed June 29, 1939  6 Sheets-Sheet 1
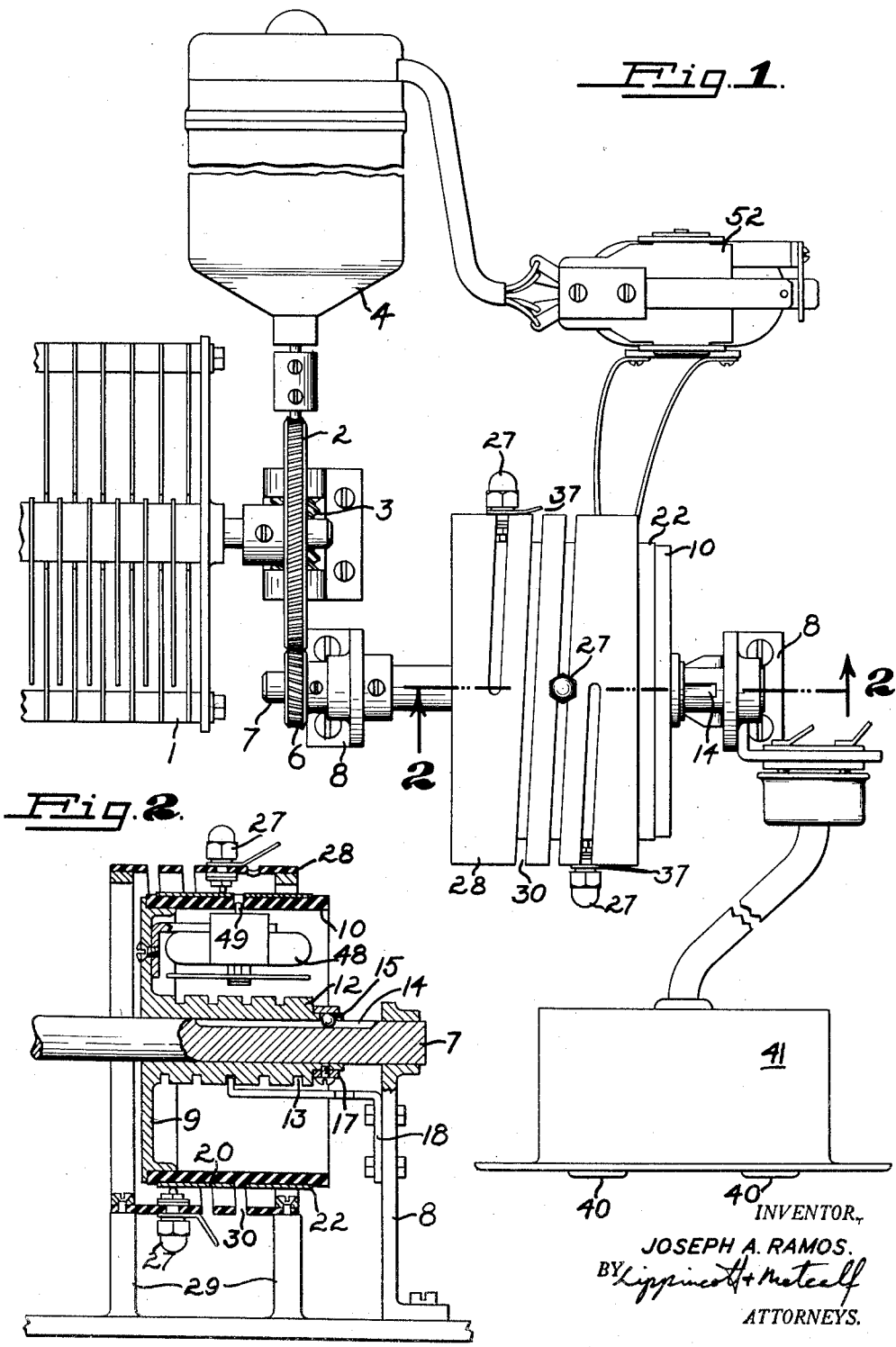
INVENTOR,
JOSEPH A. RAMOS.
BY Lippincott + Metcalf
ATTORNEYS.

INVENTOR,
JOSEPH A. RAMOS.
BY Lippincott + Metcalf
ATTORNEYS.

May 14, 1940.   J. A. RAMOS   2,200,680
REMOTE CONTROL APPARATUS
Filed June 29, 1939   6 Sheets-Sheet 3

INVENTOR,
JOSEPH A. RAMOS.
BY Lippincott & Metcalf
ATTORNEYS.

May 14, 1940. J. A. RAMOS 2,200,680
REMOTE CONTROL APPARATUS
Filed June 29, 1939 6 Sheets-Sheet 4
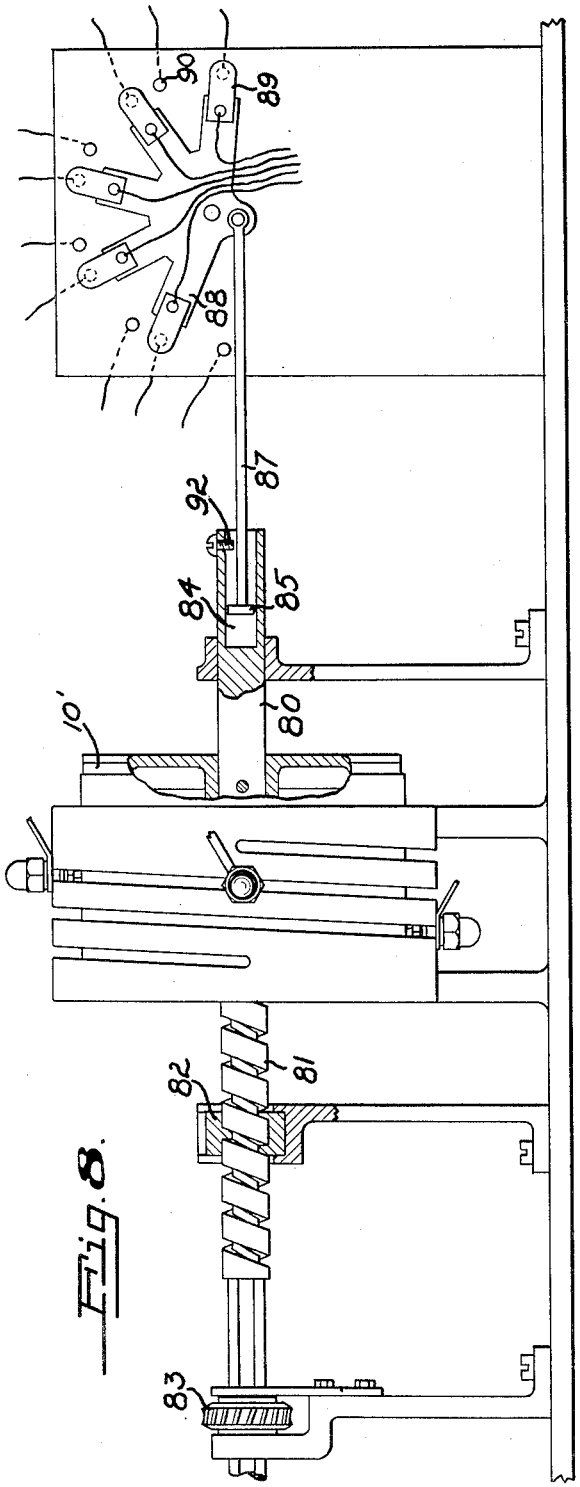
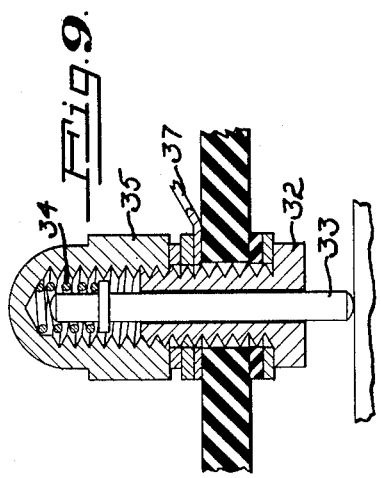
INVENTOR.
JOSEPH A. RAMOS.
BY Lippincott & Metcalf
ATTORNEYS.

May 14, 1940. J. A. RAMOS 2,200,680
REMOTE CONTROL APPARATUS
Filed June 29, 1939 6 Sheets-Sheet 5
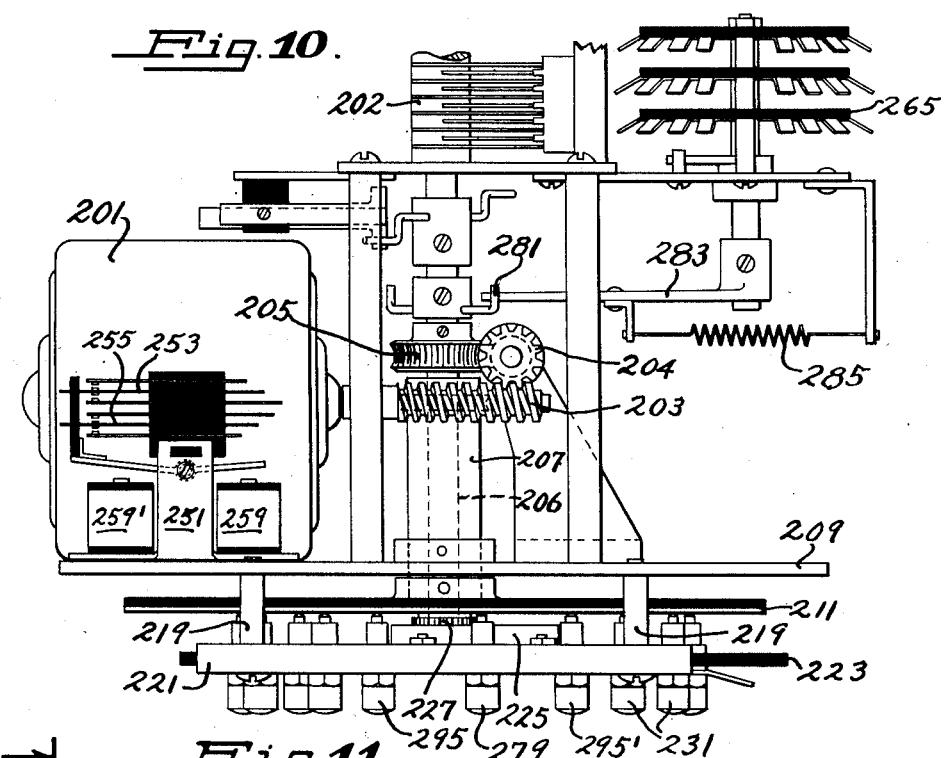
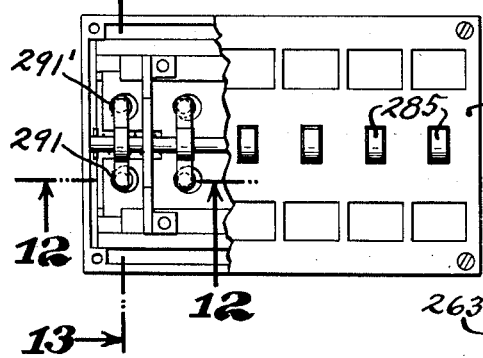
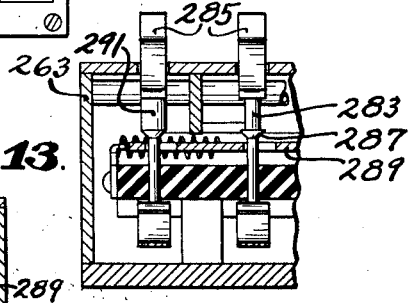
INVENTOR,
JOSEPH A. RAMOS.
BY
ATTORNEYS.

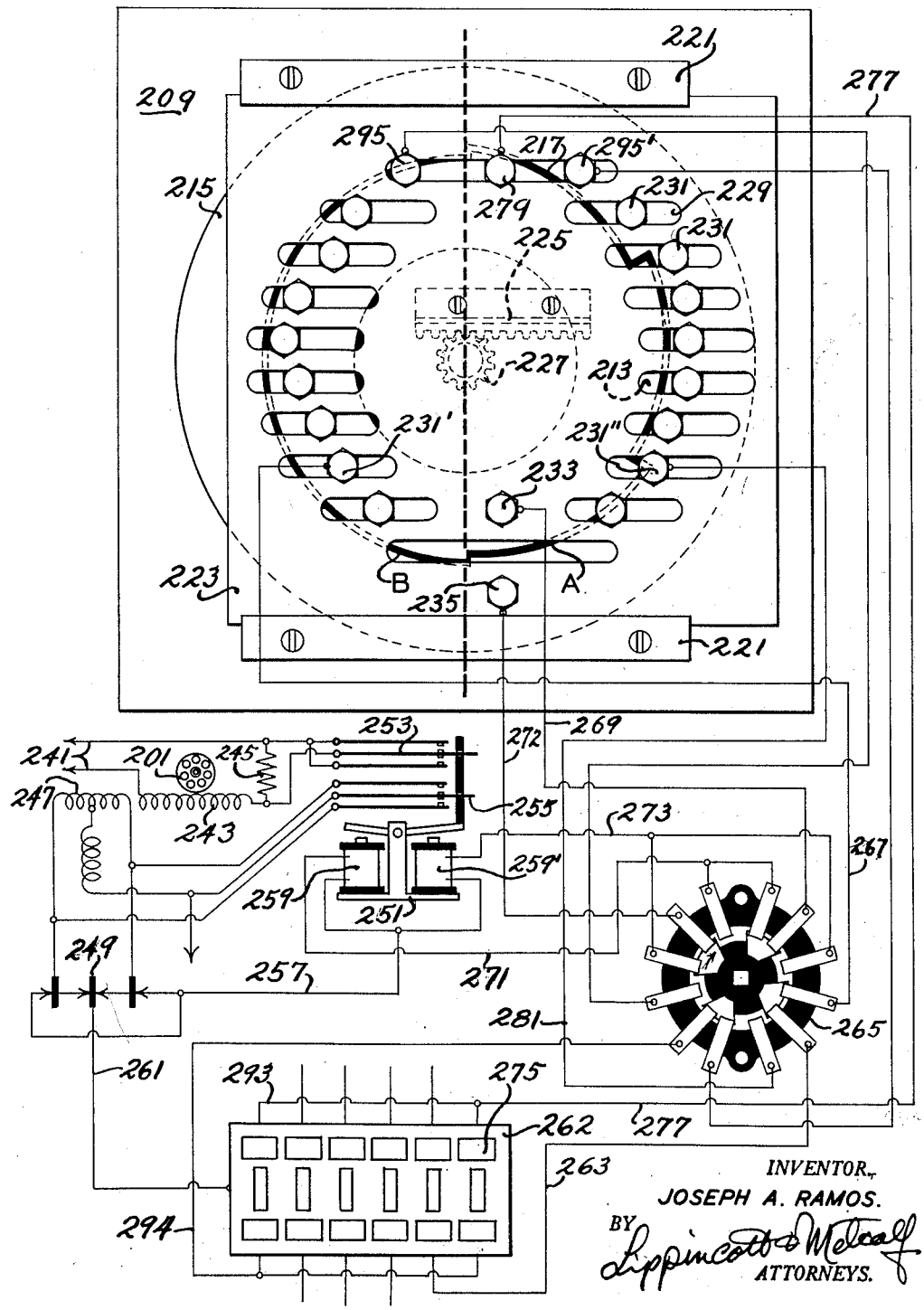

Patented May 14, 1940

2,200,680

UNITED STATES PATENT OFFICE 2,200,680

REMOTE CONTROL APPARATUS

Joseph A. Ramos, San Francisco, Calif.

Application June 29, 1939, Serial No. 281,931

21 Claims. (Cl. 172—239)

This invention relates to improvements in remote control apparatus, particularly such apparatus as is used for remote control of motorized tuning radio receivers.

The present application is a continuation-in-part and a substitute for my previously filed application, Serial No. 213,559, this application partaking of the nature of a renewal of said prior application insofar as the common subject matter is concerned.

Among the objects of the invention are:

To provide a remote control system which is capable of controlling a radio receiver with extreme precision, so that motorized tuning may be accomplished satisfactorily even upon channels in the high frequency spectrum; to provide a remote control tuning system which will afford a plurality of tuning ranges; to provide a system which will afford push button tuning in a plurality of ranges and which will make the transition from one range to another automatically when so desired; to provide a system whereby any desired number of stations may be tuned automatically; to provide a system for the control of radio receivers and the like which is operative through a motion of the control unit of over 360° of arc to control the motion of a tuning condenser or the like whose movement is limited to less than 360°; to provide a tuning system which is fast as well as accurate; to provide a tuning system which, in its broad principle, is equally adaptable to direct or alternating current operation; and, to provide a tuning system in which the final positioning is provided with a mechanical latch, but wherein the momentum of the system has been so largely and so quickly dissipated immediately prior to the engagement of said latch that the shock of bringing the system to rest is negligible.

Other objects of my invention will be apparent or will be specifically pointed out in the description forming a part of this specification, but I do not limit myself to the embodiment herein described, as various forms may be adopted within the scope of the claims.

Referring to the drawings:

Fig. 1 is a view in plan of the remote control system of this invention as applied to the control of a variable condenser.

Fig. 2 is a vertical sectional view of the control drum, the plane of section being indicated by the line 2—2 of Fig. 1.

Fig. 8 is an elevational view showing a somewhat modified form of control mounting and including a showing of automatic range charging mechanism.

Fig. 9 is a detail view showing, in section, the construction of one of the latch-contactors which operates against the control drum.

Fig. 10 is a plan view of an alternative form of my invention, embodying a disc instead of a drum for control.

Figs. 11, 12 and 13 are respectively a plan, transverse section and fragmentary longitudinal section of a form of control box for use with either the drum or disc form of my device.

Fig. 14 is a front elevation of the embodiment shown in Fig. 10, with circuits shown schematically.

Figure 3:
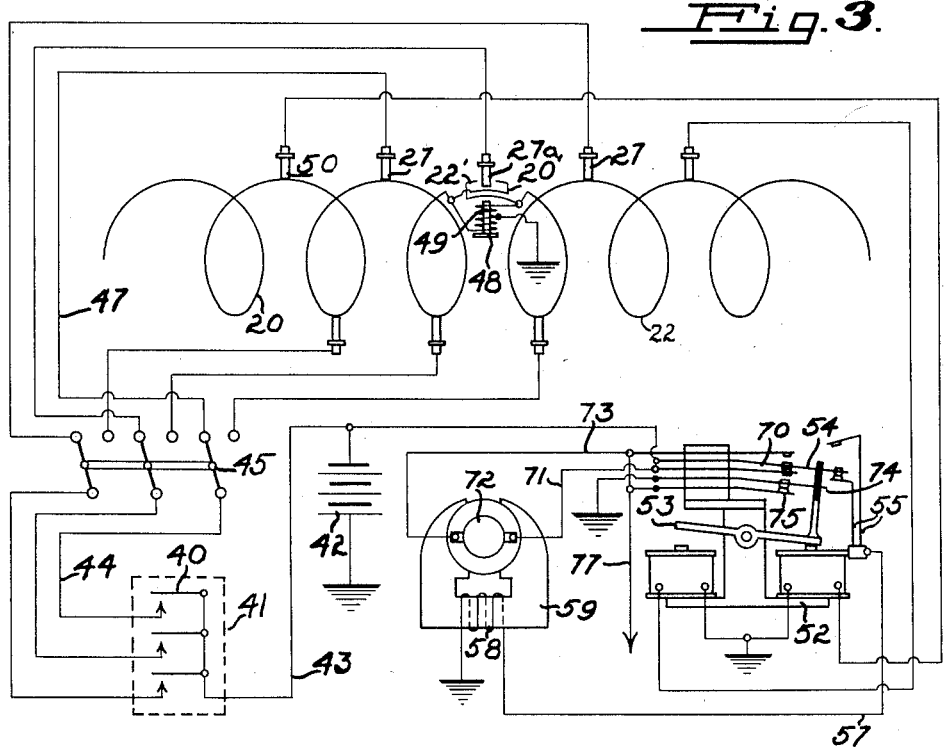
Fig. 3 is a schematic diagram of the system as applied to direct current operation.

Considered broadly, the control mechanism of this invention comprises a two part round conductor, or control member which may be either of disc or drum form, the member being mounted on a shaft which is geared to make a plurality of revolutions within the range of the device, and the division between the two conducting parts being transverse to the axis in the case of the drum or approximately circular in the case of the disc form. Bearing against the conductors of this member are a plurality of resiliently mounted contactors or contact points, so mounted and geared with respect to the motion of the member as to have a relative translational movement which, compounded with the rotational movement of the member, causes each of the points to traverse a spiral path upon the surface of the conductors, this spiral path crossing the division between the two conductors. It is to be noted that "spiral" is here used in the broad sense, as comprising either a helical path, in the drum form of the device, as well as the flat spiral path used in the disc form of the device. The division line between the two conductors is preferably also in the form of either a single spiral of one turn, or a plurality of equal segments of multiple spirals with a short transverse portion or portions, normal to the spiral, joining the ends of the single turn or the adjacent fractional turns. As will be shown in detail later, however, the division may be truly circular with advantage in certain cases.

A reversible motor is used to drive the controlled device, and connections are made between the respective conductors on the control members so that completion of the circuit through any of the contact points to one or the other of the two conductors, will cause rotation in one direction or the other respectively. Control is exercised by exciting a selected one of the contact points, connections from the conductors to the motor being such that rotation of the control member will take place in such sense as to cause the path of the contactor to approach the division between the conductors. For exciting the contact points I prefer to use a latch type of switch, which maintains a connection once formed. When such a switch is operated to excite any particular contactor, rotation continues until the contactor reaches the division between the two conductors, and tends to carry it past this divisional line onto the other, which instantaneously reverses the motor and brings the contactor to rest between the two. This "slugging" action will, of itself, give very accurate positioning of the device to be controlled, owing to the step-up gearing between the device to be controlled and the control device. The action may, however, be made more certain by extending a narrow lug or projection of each of the two conductors across the gap immediately before the point at which it is desired to bring the device to rest. Between these reversing projections or lugs a latch hole may be formed. When this expedient is used, the contact point, approaching the desired position of rest of the device, first breaks the contact to the motor, allowing the motor to coast. It then strikes the reversing lug, which sends an extremely brief momentary reversing current through the motor winding, and absorbs most of the energy of rotation of the motor, so reducing the momentum that the contact point drops into the hole between the two reversing lugs and mechanically latches the device in place. When this is used, a small magnet is preferably mounted behind the latch hole, and so connected in circuit that it is energized to disengage the latch when any other of the contact points is energized.

Where it is desired to make the device operate over a plurality of ranges, an additional contactor or contactors are provided to engage beyond the limit of normal travel of the device, so that motion beyond this range operates a limit switch which transfers the push-button or other switch connection to a different set of contactors, this second set of contactors remaining connected with the switch until a contactor operated at the o....r limit of travel of the device is brought into action, again operating the limit switch. Where the multi-range arrangement is used I prefer to locate all of the range-changing contactors at one limit of travel of the device, to take account of as many bands as desired, and to place a shut-off contactor at the opposite end, so that when the shut-off contactor is actuated the device will go to its opposite end of motion and restore the range-changing switch to its normal or most commonly used position.

The invention may be better understood by reference to the drawings, which will next be described in detail.

A preferred form of the device for single range control (or multi-range control with non-automatic range change) is shown in Figs. 1, 2 and 3. Referring first to Fig. 1, the controlled device is in this case a variable condenser 1, on the shaft of which is mounted a worm wheel 2. The worm 3, meshing with this wheel, is directly driven by a motor 4.

Gear-driven from the worm 2 is a pinion 6, secured to a shaft 7 which is journaled in bearings 8. Slidably mounted on the shaft is the frame 9 of an insulating drum 10. The hub 12 of the frame is provided with a screw thread 13. The shaft is provided with one or more keyways 14, and the hub is prevented from rotating on the shaft by ball bearings 15 which are retained in holes in the end of the hub by means of a collar 17. A bracket like finger 18, mounted on the bearing 8, engages the screw thread 13, and therefore, as the shaft is rotated, it carries the drum with it rotationally and the drum is simultaneously moved axially so that each point on its surface traces a helical path.

Figure 5:
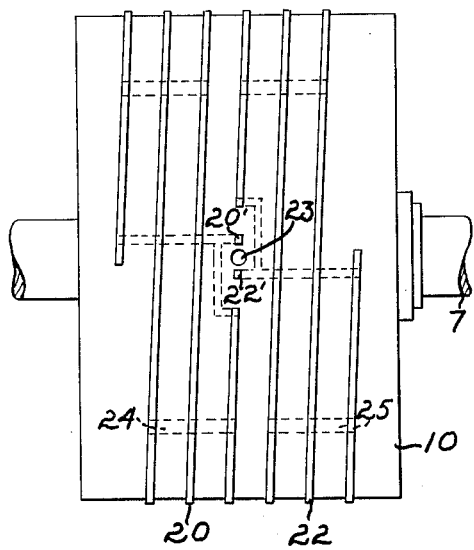
Figs. 5 and 6 are plan views showing two forms of conductor arrangement on the control drum.

Encircling each end of the drum and solidly mounted thereon are a pair of conductors 20, 22. These conductors are electrically separate, and may be formed as shown either in Fig. 5 or in Fig. 6. The portion of the conductors which is actually used is helical, as shown in Fig. 5, the two conductors together forming a continuation of the same helix and separated by a gap. Midway of this gap a hole 23 is formed through the wall of the drum 10, and immediately adjacent this hole, on either side, is a small contact point or lug 20', 22', which is connected to that conductor whose main body is disposed on the opposite side of the hole. The helical conductor has the same pitch as the screw threads 13, and hence if a stationary contactor touches the conductor at one point, it will follow the helix as the drum rotates until it reaches the gap between the conductors. Upon continued rotation of the drum it will contact the opposite conductor momentarily (through the reversing lug 20' or 22') immediately before it reaches the hole 23, "slugging" the motor and bringing it almost to a stop, so that the contact point may drop smoothly into the hole and lock the device against further motion without shock. This will occur irrespective of the direction of rotation of the drum.

Figure 6:
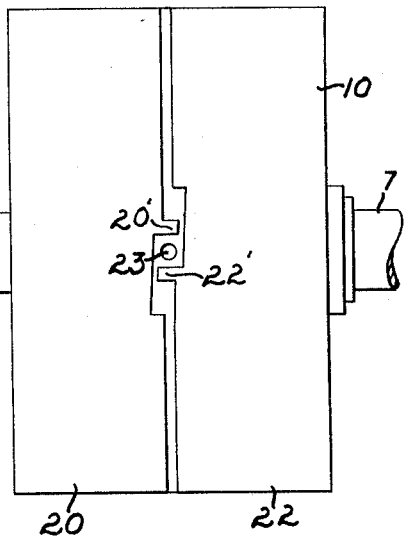

Since each of the conductors 20 and 22 is electrically continuous, it is unnecessary that they actually be formed as helices, and the cylindrical conductors shown in Fig. 6 are equally satisfactory and may be cheaper to manufacture, even though they require more material. Where helical conductors are used it may be desirable to provide them with inter-connections 24, 25, between turns, in order to decrease the effect of the electrical resistance from the end of the path.

Contacts 27, to engage the drum conductors, are mounted on a tubular insulating support 28 which surrounds the drum and is carried by brackets 29. The contacts themselves are positioned in a helical slot 30 having the same pitch as the screw threads 13. The detail of one form of such contact is shown in Fig. 9, the contact comprising a threaded bushing 32 through which passes a spring actuated contact-and-latch-plunger 33. The actuating spring 34 is mounted within the cap nut 35 which, when tightened, fixes the contactor at any desired point on the slot 30 and forms a satisfactory electrical connection with the usual connecting lug 37.

Figure 4:
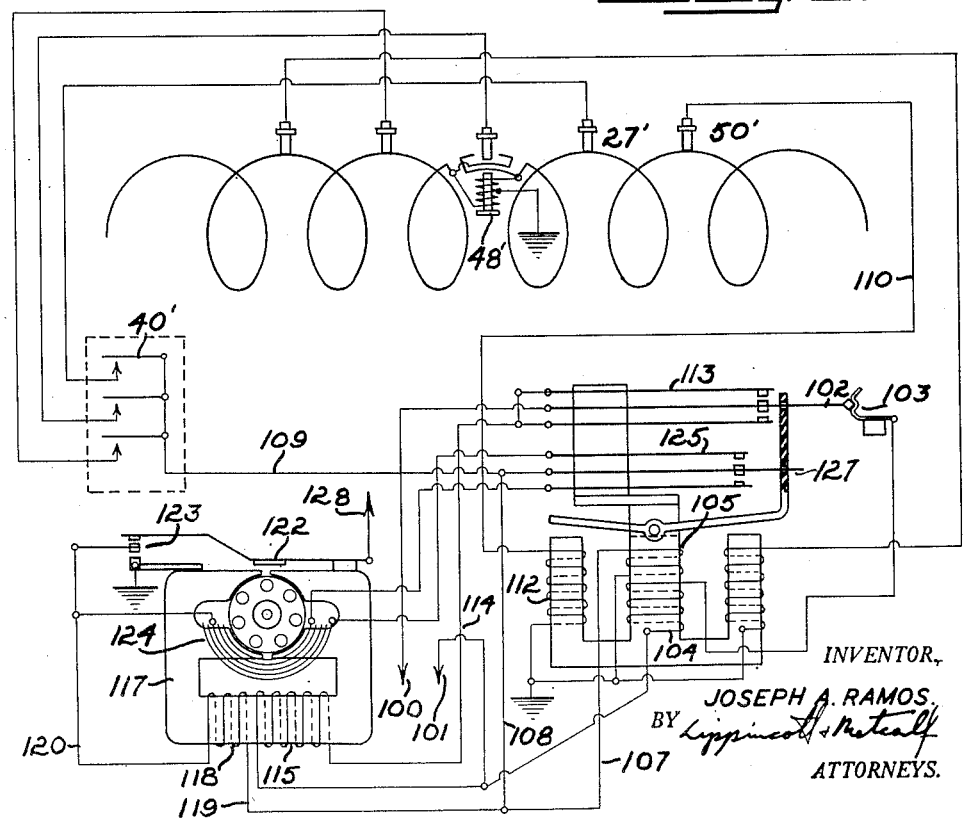
Fig. 4 is a similar diagram showing the system as applied to A.-C. operation.

The control of the motor may be directly through the contacts 27, but I prefer to operate it through a relay as shown in Figs. 3 or 4. Control is exercised preferably through a group of push buttons 40, preferably mounted in a control box 41. The number of push buttons used is largely a matter of choice, the three shown in each of the diagrams being merely indicative that a plurality will be used. Considering the form shown in Fig. 3, current for operating the device is supplied from a battery 42, one terminal of which is grounded. The leads 43 connect the other terminal to one side of each of the push buttons 40. The connections to each of the other push buttons are identical, and therefore, for the sake of simplicity, but one of these circuits will be traced out and labeled.

Following one such circuit, the other side of the push button 40 connects through a lead 44 to a change-over switch 45, which latter may either be manually or automatically operated as will later be described. The purpose of this switch is to connect the push button 40 to any one of a plurality of contactors 27, so as to provide multi-range operation of the device.

With the switch 45 in the position shown, the circuit continues from the switch through a lead 47 to the contactor 27, thence through the conductor 20, to one winding of a double winding plunger magnet 48 and from there to ground. The plunger magnet 48 is mounted within the drum 10, and carries a plunger 49 which, when the coil is excited, is drawn into the hole 23 in the drum and thus prevents any of the contact latch plungers 33 from engaging this hole or latch opening.

In parallel with the plunger magnet 48, there is a path from the contactor 27 through the conductor 20 and a similar contactor 50 to one winding of a relay 52, and thence through ground and back to the battery. Therefore, when the push-button 40 is pressed the relay armature 53 will be tilted in one or the other direction, e. g., as shown in the figure, closing the several circuits which will next be described. I prefer to use a relay of the general type shown, utilizing a plurality of spring carried contacts of the familiar telephone-jack type, but it is obvious that any form of multi-contact relay may be substituted.

A second lead from the battery 42 connects to the live contact spring 54 of the relay. When the relay is operated this spring makes contact with two circuits. The first of these is connected to one of the two parallel contact springs 55, which connect through the lead 57 to excite the field 58 of the motor 59. The other circuit leads from the live spring contact 54 through the contact spring 70, lead 71, the motor armature 72, and thence back through lead 73 and contact spring 74 and 75 to ground, causing the motor to rotate in one direction. Had the push button 40 been connected to a contactor 27 which was resting on the conductor 22 instead of conductor 20, the other coil of the relay 52 would have been actuated, and the action would have been the same except that the current through the armature would have been reversed, thus reversing the motor and causing rotation thereof in the opposite sense.

The connections of the motor are such that its direction of rotation is that which will cause the latch opening 23 in the drum 10 to approach the contact 27 which is excited. Considering what happens, therefore, when the push-button 40 is depressed, the first thing which occurs is that the plunger magnet 48 will operate, disengaging the latch plunger (designated as 27a) from the latch, and permitting the motor and drum to rotate. This rotation will continue, due to the excitation of the motor through the operation of the relay until the contactor 27 reaches the gap in the conductor. The momentum of the motor is considerable, and will cause it to coast, carrying the contactor across the gap. Immediately before it reaches the latch opening, however, it will instantaneously contact the lug 20' connecting with the opposite conductor, momentarily exciting the armature for rotation in the opposite direction.

This "slugging" of the motor dissipates most of its momentum, and since the circuit is again opened immediately after the momentary contact, the plunger magnet 48 is no longer excited and the latch plunger 33 drops into the opening 23, thus mechanically locking the device at the desired point. Further operation of this particular push-button 40 can have no further effect upon the system. Operation of any other of the group of push-buttons will initiate a similar cycle of events, the motor operating in one direction or the other, depending on the initial position of the drum and which of the two conductors 20 or 22 makes connection with the live contactor 27. If, in the course of operation, the latch opening 23 passes under one of the contactors 27 which is not excited, the plunger magnet 48 being in operation, this contactor will not latch.

It will be seen that the gear ratio between the control device 1 and the control drum may be as great as is desired.

In one device, substantially the same as that illustrated and just described, the gear ratio between the variable condenser 1 and the control drum 10 was made six to one, so that the control drum made three complete revolutions while the variable condenser was rotating through 180°, and 6° rotation of the drum was equivalent to 1° rotation of the variable condenser. Another model utilizes a gear ratio of sixteen to one, so that eight complete rotations of the drum are accomplished throughout the 180° control range of the condenser. With a drum diameter of four inches, its peripheral travel for 180° is just over one hundred inches. 1° movement of the condenser therefore corresponds to approximately 0.55 inch movement of the drum, and since the contactors can readily be set with an accuracy greater than one-sixteenth of an inch, the condenser will be positioned to an accuracy of about six seconds of arc. Greater gear ratios can, of course, be used, and hence any desired degree of accuracy of control can be obtained, due precaution being taken, of course, to prevent backlash between the control mechanism and the drum.

One of the many possible modifications of this invention is shown in Fig. 8. In this case the drum 10' is rigidly secured to the shaft 80, and the latter is provided with a threaded portion 81 which engages with a bearing nut 82. The drive gear 83 is splined to the shaft, so that both shaft and drum move axially upon rotation, instead of the drum moving axially upon the shaft.

The movement of the shaft is made to accomplish automatic operation of the switch 45. The end of the shaft is provided with a bore 84, within which fits the head 85 of a plunger 87. This plunger is pivoted at one end to a finger switch arm 88, provided with a number of contacts 89 connected to the respective push-buttons 40. The contact points 90 connect to the various contactors 27. If one of these contactors 27 be so positioned with respect to the drum that it engages beyond the normal 180° motion of the condenser, the ends of the bore 84 will strike the head of the plunger 85 and move the switch fingers 89 into connection with a different set of contacts. This connects the push-buttons 40 with a different set of contactors, and as long as these contactors are within the normal range of operation of the condenser the head 85 will merely slide back and forth within the bore in the course of operation. If, however, a contactor is excited which will carry the drum to the extreme opposite end of its range, a stop 92 will engage the head and shift the switch into an alternative position. If more than one optional position is provided, I prefer to make all the shifts but one at one extreme of the travel, so that to clear the device and stop the apparatus or actuate the cut-out switch, it is necessary to excite the one contact arranged at the opposite end of the device. The contactors operated within the band normally used will therefore always be brought into connection when the apparatus is stopped.

An additional feature which it is frequently desirable to include is a lead 77, connected to the motor lead 73 and therefore grounded, either directly or through the motor armature, whenever the relay operates. This lead may be used to ground any desired part of the reproducing system while tuning is being accomplished (e. g., the voice coil of the loud speaker), thus muting the set.

The diagram of Fig. 4 shows a method of embodying this invention in an alternating current system. In this case the supply leads 100—101 connect to the alternating current mains. Lead 100 connects through a relay contact spring 102 and its cooperating contact point 103 to a relay winding 104, which also acts as a transformer primary. The other end of this winding connects back to the supply lead 101. A secondary winding 105 has one end connected to ground and the other, through leads 107, 108 and 109 to the push-button 40', which connects to drum contacts and drum in the same manner as the direct-current form of the device, one branch of the circuit returning to ground through the plunger magnet 48'; the other connects through the contact 50' and lead 110 through the coil 112 on one arm of the relay magnet and thence back to ground. When the circuit just described is open the pull on the two arms of the relay armature is substantially evenly divided; excitation of the coil 112 destroys this balance, thus closing the various motor circuits.

One of these circuits may be traced from the lead 100 through the contact springs 102, 113, and lead 114 through the field coil 115 of the motor 117 and thence back to the other supply lead 101. Operation of the relay breaks the primary relay winding, and this would normally de-energize the relay, but coupled to the coil 115 of the motor is a secondary winding 118, which energizes coil 105 of the relay through the leads 119, 120, and ground and holds the relay in operating position.

The ground connection to lead 120 is, in this instance, made through the use of the motor itself as a relay, an armature 122, mounted on the motor frame, being attracted to connect the relay contact 123 to ground.

Also connected to leads 119 and 120 is a circuit leading through one-half of the crescent coil 124 of the reversible A. C. motor, this circuit being traced from the lead 120 through the half of the crescent coil and the spring contacts 125 and 127 of the relay back to lead 119. The direction of rotation of the motor depends upon which half of the crescent coil is excited; excitation of the other leg of the relay operates the relay in the opposite sense to complete the connection to the other half of the crescent coil and thus reverse the motor. Muting of the reproducer may be accomplished by grounding the connection 128 by means of the relay armature 122 of the motor. In other respects the operation of this form of the device is the same as that already described.

Figure 7:
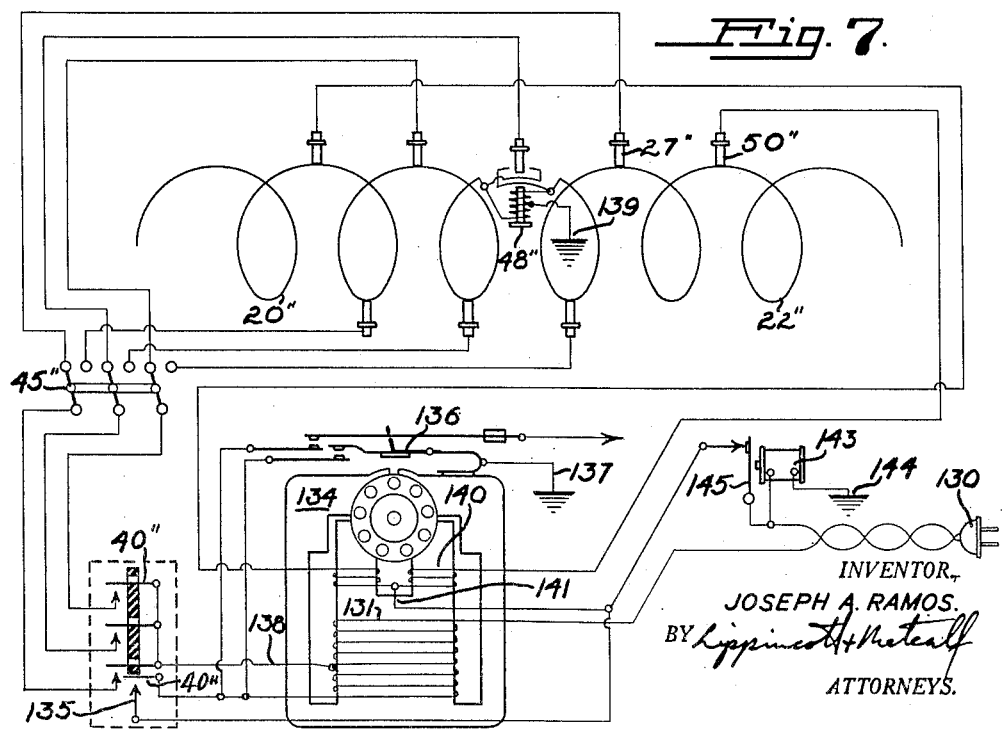
Fig. 7 is a diagrammatic view of a modified form of the device as used as alternating current.

The modification shown in Fig. 7 operates on the A. C. supply system directly, without the intervention of a relay. In this case one terminal of a connecting plug 130, for tapping in on the supply mains, connects directly to the main field winding 131 of the reversible A. C. motor 134. The other end of this winding connects back to the other side of the supply circuit through an additional contact 135, which closes with the operation of any of the control buttons 40''. Closing this contact operates the relay armature 136 on the motor field, and grounds the supply circuit to the chassis at 137.

The individual push buttons are all connected to a tap 138 on the field winding, and lead, through a change-over switch 45'' to the contactor 21'', and thence through the drum conductors 22'' or 20'' back to ground at 149 as in the embodiments previously described. The branch circuit for reversing the motor connects from the contactor 50'' to one pole winding 140 of the motor, these pole windings having a common tap 141 which connects back to the main supply line. The control circuit through the drum and its contactors therefor bridges one of the two pole windings, to the motor across a portion of the main field winding, the direction of rotation of the motor being determined by which pole winding is thus excited.

This arrangement, it will be noted, utilizes ground returns for a portion of the circuit which is connected directly with the main supply lead, the so-called "ground" usually being through the metal chassis of the receiver which may or may not have an actual connection to earth. If an actual ground is provided, short circuiting may occur owing to the fact that one side of the a-c supply is frequently grounded also. In order to prevent this a circuit breaker may be used, comprising a coil 143 bridged between the side of the supply lead which is supposed to be connected to ground and a ground 144 on the chassis. If the plug 30 be wrongly inserted in its receptacle, when the chassis is actually connected to earth, this will excite the coil 143, attracting the armature 145, and opening the circuit before harm can be done. If the plug be properly inserted the relay will be shorted out by the ground connection and no harm done.

The necessity for using the relay may be avoided by using a metallic connection between the points connected to ground at 137 and at 139. This involves, however, the possibility that certain portion of the chassis may be "hot" when the apparatus is plugged in, so that it may, from the point of view of safety, be desirable to use the relay arrangement.

Figures 10 and 14 illustrate the principles of my invention as applied to a flat or disc control, in place of a drum. In this case the motor 201 drives the variable condenser 202 (or other device to be controlled) through a double worm-gear 203. The outer end of the worm engages a worm-wheel 204 which drives a second worm engaging a worm-wheel 205 on the condenser shaft 206. The inner end of the worm 203 engages a second worm-wheel on a sleeve 207, which extends through the front panel 209 and carries upon its outer end a control disc 211. This arrangement causes a plurality of revolutions of the disc within a single half revolution of the condenser shaft. Mounted on the face of the insulating disc are two circular conductor plates 213 and 215, separated by a substantially circular gap (filled with insulating material) 217.

Supported in front of the panel or face-plate 209 on struts 219 is a pair of ways 221 wherein is mounted a sliding plate 223 also of insulating material.

Secured to the plate 223 is a rack 225 which meshes with a pinion 227, mounted on the condenser shaft, so that rotation of the shaft will give a translational motion to the plate 223.

Formed in the plate 223 are a plurality of horizontal slots 229, in each of which can be mounted one or more contactors 231. The slots 229 are preferably made slightly longer than the limit of the motion of the rack 225 within the operating range of the device, and since the slots are closely spaced around the periphery of the insulating segment 217 (when the plate 223 is in its central position) and the contactors 231 may be moved in these slots at will, a position can always be found where a contactor may be made to reverse the motor operation within a very small motion of the disc and a correspondingly much smaller motion of the driven or controlled mechanism.

It will be seen that the transverse or translational motion of the plate 223, compounded with the rotational motion of the disc 211, causes each of the contactors 231 to traverse a spiral path across the face of the disc, which corresponds to the helical motion of the contactors 27 with respect to the drum in the form of the device shown in Fig. 1.

It will also be noted that there are two contactors, 233 and 235 which are mounted in fixed relation to the plate 223. These contactors are so positioned with respect to the conductors 213 and 215 that, within the limits of motion of the device, the contactor 233 always engages the conductor 213 while the contactor 235 at all times engages the conductor 215. These two contactors are used for manual control or tuning, so that when contactor 233 is excited the motor always runs in one direction whereas when the contactor 235 is excited the motor runs in the opposite direction.

The contactors 231 may be connected exactly as are contactors 27 in the form of the device first shown. In Fig. 14, however, a slightly different circuit is illustrated, utilizing a switching mechanism which I have found somewhat better adapted to the plate form of the device.

Before going on to these circuit connections, however, attention is called to the insulating division line 217 between the conductors 213 and 215, as shown in two modifications on the two sides of the drawing of Fig. 14. On the right side of the figure, and designated by the reference character A, this division line takes the form of equal segments of a six-thread spiral, the pitch of this spiral being equal to the average pitch of the spiral paths of the contacts 231 as they traverse the face of the control disc. This pitch is, of course, controlled by the gear ratio between the disc and the mounting plate 223, and it will be seen that any one of the contacts 231 may be positioned to traverse any one of the six helical paths, so that there are six possible angular positions of the disc at which any one of the contacts 231 can be set so that it will cross the break between the conductors 213 and 215 at right angles, as well as six or more positions within the slot where the contactors can be set so to cross the break at right angles depending upon what portion of the entire range of the device it is desired to have a particular contactor control. With the large number of contactors available this arrangement permits the control of the final positioning of the condenser to a very high degree of accuracy.

The other side of the drawing, designated by reference character B, however, shows a circular dividing line between the two conductors 213 and 215. In this case the operation is different, since the contactors never pass from one conductor to the other at right angles to the dividing line, their paths being obliquely across the line after the manner of a spiral crossing a circle.

It would naturally appear, in considering the arrangement shown on the lefthand side of the figure, that the controlling effect of this arrangement would be no more accurate than that to be achieved by the translational motion of the contacts alone; i. e., that the effect would be the same as though the disc 215 were disconnected from the shaft and the contacts were moved across a stationary divided disc instead of a moving disc.

I have found, however, that the effect is very different and that very great accuracy in setting for a particular control position may be achieved at the circular division between the two halves of the disc, i. e., between the conductors 213 and 215. With the disc stationary, no greater accuracy of control can be achieved than with a simple translational movement of the very limited range shown. With the disc rotating, however, the break appears always to occur at exactly the same place, and the disc will always come to rest within an extremely small angular range. In view of the relatively high gear ratio between the disc and the controlled device, this means that such device may be controlled within an even narrower range of error. I am not at all certain why the movement of the disc should give such greatly improved results, but the results are so consistent in repeated experiments that I am sure that the difference does exist and that it amounts to an increased accuracy of control which reduces the deviation from that to be achieved by translational motion alone to a very small fraction of that value.

Turning now to the connection shown in Fig. 14, only a few of the various circuits are shown, since the others are duplicates thereof and their inclusion would only serve to confuse the drawings.

Starting with the line 241, for connection with an a. c. power supply, current passes through the field winding 243, in series with a current-limiting resistor 245. Coupled with the field winding is a reversing winding 247, of the pole shading type, the terminals of which are connected to a rectifier 249, this rectifier being connected in conventional manner to give full wave rectification. It is to be noted that the rectifier is not a necessary adjunct to the circuit, but is used in order to assure complete quiet in the operation of the relay 251. It is obvious that, except for quietness of operation, an alternating current relay could be used equally as well.

The relay shown is a double coil affair, capable of moving in either direction to complete either of two sets of circuits. It is equipped with two sets of contacts. The contacts 253 short out the current limiting resistor 245 whenever the relay operates in either direction. The contact 255 closes one or the other side of the shading pole winding to cause the motor to rotate in one or the other direction. The resistor 245 permits enough current to flow in the motor coils to operate the relay, but not to heat the motor even though its field circuit be left closed indefinitely. When this resistor is shorted out by operation of the relay the motor can deliver full power.

From the rectifier, one lead 257 connects to the common lead between the two coils 259 and 259' of the relay. The other connection 261 is the common lead to the control box 262, here shown schematically and later to be described in detail. For the present, however, it may be considered merely as an array of latching push buttons, similar to the familiar buttons used for interconnecting telephone service.

Following out the circuit 263 from one of the switches, this lead connects to one contact of a change-over switch 265, and then, from the position of the switch shown, to one of the contactors 231', this contactor being shown as in contact with the inner conductor 213 of the control disc. The circuit continues through the contactor and the lead 269 to another contact on the change-over switch, from which it is connected, through the lead 271, to the coil 259 of the relay 251, and then, through the lead 257, back to the rectifier. The operation of the push button therefore operates the relay to operate the motor in such direction as to slide the contactor 231' across the face of the rotating disc until it passes the divisional line and contacts the conductor 215. When this occurs the return circuit from the control disc through the contactor 233 is broken and a circuit is made through the contactor 235, the lead 272, still another contact of the changeover switch, and thence through a lead 273 to the coil 259'. This reverses the motor instantaneously, but the motor does not have time to acquire appreciable momentum upon this reversal and comes to rest as soon as the contactor 231' reaches the insulating division 217, thus stopping the apparatus at its required position.

Any of the other contactors on the left side of the plate 223 are connected and operated in the same manner, the changeover switch being conveniently made in the multiple bank type shown clearly in Fig. 10, to accommodate the necessary number of leads to the contactors.

The two groups of contactors, i. e., the contactors at the right and left of the plate 223, are adapted to control different ranges of operation of the apparatus. Change of range from one group to the other is accomplished by energizing one of the switches 275 of the control box 262 which is specifically provided for this purpose. This switch connects through a lead 277 to the contactor 279, which is so positioned that in all positions of the plate 223, except at the extreme limits of its travel, it contacts the inner disc 213. With the positioning of the plate 223 and the switch 265 as shown, this causes the motor to rotate in such direction as to move the plate 223 to the left, to the limit of rotation of the device where it stops upon the division 217 and opens the motor circuit. When this occurs, an actuating arm 281 (Fig. 10) strikes the switch arm 283, which causes the switch to trip, urged by the toggle spring 285. This turns the rotor element of the switch 265 clockwise, as shown in Fig. 14, which accomplishes several purposes. First, the contact 233, which previously was connected to coil 259 of the relay, is now connected to coil 2595, which reverses the direction of rotation of the motor for contact with the inner conductor. Contactor 235, which was formerly connected through leads 272 and 273 to coil 259', is now connected through lead 271 to coil 259. Lead 263 from the control box 262, which previously connected through lead 267 to the contactor 231' is now shifted so that it connects through lead 281 to contactor 231", and all connections from the control box to the contactors of the left-hand group as similarly shifted to contactors of the right-hand group. The reversal in the direction of the motor when shifting from the contacts of one group to the other is necessary, because whereas a motion of the plate 223 will shift the contactors of the first group from the inner to the outer of the disc conductors, the same motion will shift the contactors of the second group from the outer to the inner conducting disc.

It will be seen that as with the form of device as previously shown, motion of the device to the limit of its travel thus automatically shifts the group of contactors controlling the device, so that each of the switches of the control box may be used to select a station in each range of control.

In the form of control box shown in Figs. 11, 12 and 13, the push-button contactors 283 are operated by toggle-type levers 285, so that five of these levers will operate ten push buttons. The contact pins 283 are supplied with flanges 287 which act as cams to operate a spring-actuated locking and contact plate 289, when any of the pins is depressed, passing under this plate when thrown all the way down. The operation of any of the pin contacts actuates this plate to release any other which may previously have been used. Two of the pins 291 and 291' however are not reduced in diameter above the conical cam surface of the flange, and hence will not lock. These are the pins which close the circuit to leads 293 and 294, connecting respectively to the two upper contactors 295 and 295'. The toggle switch operating the two pins 291 and 291' is therefore used for manual tuning and for band shifting, and since the contactors 295 and 295' are reversed at the same time that the others are, throwing the toggle lever which actuates them in one direction always produces motion of the control device in the same sense.

I claim:

1. A remote control apparatus comprising the combination with a controlled device and a reversible motor for driving said device, of a rotary member positively rotated in accordance with the motion to be controlled, a pair of conductors encircling the axis of said member and separated by an insulating division, a plurality of contactors for engaging said conductors, means operative upon rotation of said member to cause a relative translational movement between said member and said contactors so that each contactor traces a spiral path along the surface of said conductors, said path crossing the division therebetween, connections between said conductors and said motor for causing rotation thereof in one direction upon excitation of one thereof and rotation in the opposite direction upon excitation of the other and means for selectively exciting said contactors.

2. A remote control apparatus comprising the combination with a controlled device and a reversible motor for driving said device, of a rotary member positively rotated in accordance with the motion to be controlled, a pair of conductors encircling the axis of said member and separated by an insulating division, a plurality of contactors for engaging said conductors, supporting means for said contactors including means for positioning said contactors in selected relation to said supporting means, means operative upon rotation of said member to cause a relative translational movement between said member and said supporting means so that each contactor traces a spiral path along the surface of said conductors, said path crossing the division therebetween, connections between said conductors and said motor for causing rotation thereof in one direction upon excitation of one thereof and rotation in the opposite direction upon excitation of the other and means for selectively exciting said contactors.

3. A remote control apparatus comprising the combination with a controlled device and a reversible motor for driving said device, of a rotary member positively rotated in accordance with the motion to be controlled, a pair of conductors encircling the axis of said member and separated by an insulating division, a plurality of contactors for engaging said conductors, means for supporting said contactors in a plurality of groups including means for holding said contactors in selected positions upon said supporting means, means operative upon rotation of said member to cause a relative translational movement between said member and said supporting means, so that each contactor traces a spiral path along the surface of said conductors, said path crossing the division therebetween, connections between said conductors and said motor for causing rotation thereof in one direction upon excitation of one thereof and rotation in the opposite direction upon excitation of the other, means for selectively exciting any of the contactors of one group and means for transferring the selective exciting means from one of said groups to another.

4. A remote control apparatus comprising the combination with a controlled device and a reversible motor for driving said device, of a rotary member positively rotated in accordance with the motion to be controlled, a pair of conductors encircling the axis of said member and separated by an insulating division, a plurality of contactors for engaging said conductors, means for supporting said contactors in a plurality of groups including means for holding said contactors in selected positions upon said supporting means, means operative upon rotation of said member to cause a relative translational movement between said member and said supporting means, so that each contactor traces a spiral path along the surface of said conductors, said path crossing the division therebetween, connections between said conductors and said motor for causing rotation thereof in one direction upon excitation of one thereof, and rotation in the opposite direction upon excitation of the other, means for selectively exciting any of the contactors of one group, and means operative upon motion of the controlled device to the limit of its range for transferring the selective exciting means from one of said groups to another.

5. A remote control apparatus comprising the combination with a controlled device and a reversible motor for driving said device, of a rotary member positively rotated in accordance with the motion to be controlled, a pair of conductors encircling the axis of said member and separated by an insulating division, a plurality of contactors for engaging said conductors, means for supporting said contactors in a plurality of groups including means for holding said contactors in selected positions upon said supporting means, means operative upon rotation of said member to cause a relative translational movement between said member and said supporting means, so that each contactor traces a spiral path along the surface of said conductors, said path crossing the division therebetween, connections between said conductors and said motor for causing rotation thereof in one direction upon excitation of one thereof, and rotation in the opposite direction upon excitation of the other, means for selectively exciting any of the contactors of one group, and means operative upon motion of the controlled device to the limit of its range for transferring the selective exciting means from one of said groups to another and to reverse the connections between the control conductors and the motor.

6. A remote control apparatus comprising the combination with a controlled device and a reversible motor for driving said device, of an insulating drum positively rotated in accord with the motion to be controlled, screw mechanism attached to said drum to cause helical motion thereof upon its rotation, a pair of conductors encircling said drum, one of said conductors being disposed about each end thereof, said drum having a latching opening formed between said conductors, connections from said conductors to excite said motor for forward and reverse motion respectively, a resiliently actuated contactor positioned to engage either said conductors or said latch opening, depending upon the position of said drum, and means operative upon current flow through either of said conductors to disengage said contactor from said latch opening.

7. A remote control apparatus comprising the combination with a controlled device and a reversible motor for driving said device, of an insulating drum positively rotated in accord with the motion to be controlled, screw mechanism attached to said drum to cause helical motion thereof upon its rotation, a pair of conductors encircling said drum, one of said conductors being disposed about each end thereof, said drum having a latching opening formed between said conductors, connections from said conductors to excite said motor for forward and reverse motion respectively, a plurality of resiliently actuated contactors disposed about said drum in position to engage said conductors or said latch opening depending upon the position of said drum, and means operative upon current flow through either of said conductors for preventing the engagement of any of said contactors with said latch opening.

8. A remote control apparatus comprising the combination with a controlled device and a reversible motor for driving said device, of an insulating drum positively rotated in accord with the motion to be controlled, screw mechanism attached to said drum to cause helical motion thereof upon its rotation, a pair of conductors encircling said drum, one of said conductors being disposed about each end thereof, said drum having a latching opening formed between said conductors, connections from said conductors to excite said motor for forward and reverse motion respectively, a plurality of resiliently actuated contactors disposed about said drum in position to engage said conductors or said latch opening depending upon the position of said drum, means operative upon current flow through either of said conductors for preventing the engagement of any of said contactors with said latch opening, and means for selectively energizing any one of said contactors.

9. A remote control apparatus comprising the combination with a controlled device and a reversible motor for driving said device, of an insulating drum positively rotated in accord with the motion to be controlled, screw mechanism attached to said drum to cause helical motion thereof upon its rotation, a pair of conductors encircling said drum, one of said conductors being disposed about each end thereof, said conductors being spaced to form a gap therebetween, contactors arranged about the periphery of said drum to energize the motor, means for energizing any selected one of said contactors, and a pair of spaced reversing contacts disposed within said gap for making a momentary contact with said contactors to dissipate the momentum of said motor to bring the same substantially to rest with the selected contactor between said reversing contacts.

10. A remote control apparatus comprising the combination with a controlled device and a reversible motor for driving said device, of an insulating drum positively rotated in accord with the motion to be controlled, screw mechanism attached to said drum to cause helical motion thereof upon its rotation, a pair of conductors encircling said drum, one of said conductors being disposed about each end thereof, said conductors being spaced to form a gap therebetween, contactors arranged about the periphery of said drum to energize the motor, means for energizing any selected one of said contactors, a pair of spaced reversing contacts disposed within said gap for making a momentary contact with said contactors to dissipate the momentum of said motor to bring the same substantially to rest with the selected contactor between said reversing contacts, and means cooperating with the selected contactor formed in said drum between said reversing contacts for latching said drum against further rotation.

11. A remote control apparatus comprising the combination with a controlled device and a reversible motor for driving said device, of an insulating drum positively rotated in accord with the motion to be controlled, screw mechanism attached to said drum to cause helical motion thereof upon its rotation, a pair of conductors encircling said drum, one of said conductors being disposed about each end thereof, said conductors being spaced to form a gap therebetween, contactors arranged about the periphery of said drum to energize the motor, means for energizing any selected one of said contactors, a pair of spaced reversing contacts disposed within said gap for making a momentary contact with said contactors to dissipate the momentum of said motor to bring the same substantially to rest with the selected contactor between said reversing contacts, means disposed between said reversing contacts for interlocking said selected contactor and said drum against rotation, and means operative on flow of current through either of said conductors for rendering said interlocking means inoperative.

12. A remote control apparatus comprising the combination with a controlled device and a reversible motor for driving said device, of an insulating drum positively rotated in accord with the motion to be controlled, screw mechanism attached to said drum to cause helical motion thereof upon its rotation, a pair of conductors encircling said drum, one of said conductors being disposed about each end thereof, said drum having a latching opening formed between said conductors, connections from said conductors to excite said motor for forward and reverse motion respectively, a resiliently actuated contactor positioned to engage either said conductors or said latch opening depending upon the position of said drum, and a magnet mounted within the drum and connected for actuation from either of said conductors to close said latch opening.

13. A remote control apparatus comprising the combination with a controlled device and a reversible motor for driving said device, of an insulating drum positively rotated in accord with the motion to be controlled, screw mechanism attached to said drum to cause helical motion thereof upon its rotation, a pair of conductors encircling said drum, one of said conductors being disposed about each end thereof, said drum having a latching opening formed between said conductors, connections from said conductors to excite said motor for forward and reverse motion respectively, a resiliently actuated contactor positioned to engage either said conductors or said latch opening depending upon the position of said drum, and a magnet mounted within said drum and provided with a plunger operating into said latch opening and substantially flush with the surface of said drum when the magnet is excited, said magnet being connected to operate upon energization of either of said conductors.

14. The combination with a controlled device and a reversible motor for operating said device, of a drum geared for more than a single revolution when said controlled device is operated through its range, a plurality of contactors disposed in a helical path around said drum, screw mechanism on said drum for causing said contactors to trace a helical contact path on the surface of said drum when the latter is rotated, a pair of conductors mounted on said contact path and separated by a gap in said path, forward and reverse connections from said motor to said conductors respectively, said connections being made in such sense as to cause said gap to approach a contact on whichever conductor may be energized, and means for energizing any selected one of said contactors to operate said motor.

15. The combination with a controlled device and a reversible motor for operating said device, of a drum geared for more than a single revolution when said controlled device is operated through its range, a plurality of contactors disposed in a helical path around said drum, screw mechanism on said drum for causing said contactors to trace a helical contact path on the surface of said drum when the latter is rotated, a pair of conductors mounted on said contact path and separated by a gap in said path, forward and reverse connections from said motor to said conductors respectively, said connections being made in such sense as to cause said gap to approach a contact on whichever conductor may be energized, means for energizing any selected one of said contactors to operate said motor, and latching means disposed in said gap for locking said drum against further rotation upon engagement of a contactor therewith.

16. The combination with a controlled device and a reversible motor for operating said device, of a drum geared for more than a single revolution when said controlled device is operated through its range, a plurality of contactors disposed in a helical path around said drum, screw mechanism on said drum for causing said contactors to trace a helical contact path on the surface of said drum when the latter is rotated, a pair of conductors mounted on said contact path and separated by a gap in said path, forward and reverse connections from said motor to said conductors respectively, said connections being made in such sense as to cause said gap to approach a contact on whichever conductor may be energized, a plurality of control switches connected to certain of said contactors, and means for simultaneously transferring said control switches into connection with other of said contactors.

17. The combination with a controlled device and a reversible motor for operating said device, of a drum geared for more than a single revolution when said controlled device is operated through its range, a plurality of contactors disposed in a helical path around said drum, screw mechanism on said drum for causing said contactors to trace a helical contact path on the surface of said drum when the latter is rotated, a pair of conductors mounted on said contact path and separated by a gap in said path, forward and reverse connections from said motor to said conductors respectively, said connections being made in such sense as to cause said gap to approach a contact on whichever conductor may be energized, a plurality of control switches connected to certain of said contactors, and means operative on movement of said drum beyond predetermined limits for simultaneously transferring said control switches into connection with other of said contactors.

18. The combination with a controlled device and a reversible motor for operating said device, of a drum geared for more than a single revolution when said controlled device is operated through its range, a plurality of contactors disposed in a helical path around said drum, screw mechanism on said drum for causing said contactors to trace a helical contact path on the surface of said drum when the latter is rotated, a pair of conductors mounted on said contact path and separated by a gap in said path, forward and reverse connections from said motor to said conductors respectively, said connections being made in such sense as to cause said gap to approach a contact on whichever conductor may be energized, a plurality of control switches connected to certain of said contactors, means operative on axial movement of said screw mechanism beyond predetermined limits for simultaneously transferring said control switches into connection with other of said contactors.

19. The combination with a controlled device and a reversible motor for operating said device, of a drum geared for more than a single revolution when said controlled device is operated through its range, a plurality of contactors disposed in a helical path around said drum, screw mechanism on said drum for causing said contactors to trace a helical contact path on the surface of said drum when the latter is rotated, a pair of conductors mounted on said contact path and separated by a gap in said path, forward and reverse connections from said motor to said conductors respectively, said connections being made in such sense as to cause said gap to approach a contact on whichever conductor may be energized, a plurality of control switches connected to certain of said contactors, means operative upon motion of said drum beyond the normal working range of said controlled device for transferring said control switches into connection with other of said contactors and for retransferring said control switches and shutting off the entire apparatus upon motion of said drum beyond said normal range in the other direction.

20. The combination with a controlled device and a reversible motor for operating said device, of a drum geared for more than a single revolution when said controlled device is operated through its range, a plurality of contactors disposed in a helical path around said drum, screw mechanism on said drum for causing said contactors to trace a helical contact path on the surface of said drum when the latter is rotated, a pair of conductors mounted on said contact path and separated by a gap in said path, forward and reverse connections from said motor to said conductors respectively, said connections being made in such sense as to cause said gap to approach a contact on whichever conductor may be energized, a plurality of control switches, a transfer switch connected to said control switches and to a plurality of groups of said contactors to switch said control switches between said groups, a control member on said transfer switch, and a pair of limit stops on said screw mechanism engaging said control member to transfer said connections upon axial movement of said mechanism beyond predetermined limits in either direction.

21. The combination with a controlled device and a reversible motor for operating said device, of a pair of insulated rotatable conductors geared to make more than a single revolution when said device is operated through its range, means for causing an axial movement of said conductors when rotated, contacting means for engaging one or the other of said conductors in accordance with the axial position thereof, forward and reverse connections from said motor to said conductors respectively, said connections being in such sense as to cause the approach of the other conductor to said contacting means when one is excited, and means for energizing said contacting means and said motor to operate the latter.

JOSEPH A. RAMOS.